United States Patent
Fujiki et al.

(10) Patent No.: US 8,718,405 B2
(45) Date of Patent: May 6, 2014

(54) POSITION AND ORIENTATION MEASUREMENT APPARATUS, POSITION AND ORIENTATION MEASUREMENT METHOD, AND PROGRAM

(75) Inventors: Masakazu Fujiki, Kawasaki (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 13/517,164

(22) PCT Filed: Feb. 23, 2011

(86) PCT No.: PCT/JP2011/054677
§ 371 (c)(1),
(2), (4) Date: Jun. 19, 2012

(87) PCT Pub. No.: WO2011/105615
PCT Pub. Date: Sep. 1, 2011

(65) Prior Publication Data
US 2012/0275654 A1    Nov. 1, 2012

(30) Foreign Application Priority Data
Feb. 26, 2010    (JP) ................................. 2010-043059

(51) Int. Cl.
*G06K 9/00*    (2006.01)
*G06K 9/32*    (2006.01)

(52) U.S. Cl.
USPC ............................ 382/294; 382/106; 382/154

(58) Field of Classification Search
USPC .......................................... 382/106, 154, 294
See application file for complete search history.

(56) References Cited

U.S. PATENT DOCUMENTS 6,823,080 B2 *    11/2004    Iijima et al. .................... 382/154
(Continued)

FOREIGN PATENT DOCUMENTS

| JP | 1-009307 A | 1/1989 |
| JP | 10-003547 A | 1/1998 |
| JP | 2001-283201 A | 10/2001 |
| JP | 2010-256037 A | 11/2010 |

OTHER PUBLICATIONS

Hartmut Surmann, Andreas Nüchter, Joachim Hertzberg, "An autonomous mobile robot with a 3D laser range finder for 3D exploration and digitalization of indoor environments", Robotics and Autonomous Systems, vol. 45, Issues 3-4, Dec. 31, 2003, pp. 181-198.*

Z. Zhang, "A Flexible New Technique For Camera Calibration," IEEE Transactions on Pattern Analysis and Machine Intelligence, vol. 22, No. 11, pp. 1330-1334, Nov. 2000.

(Continued)

*Primary Examiner* — Utpal Shah
(74) *Attorney, Agent, or Firm* — Fitzpatrick, Cella, Harper & Scinto

(57) ABSTRACT

A position and orientation measurement apparatus for measuring the position and orientation of a target object includes a first search unit which searches a geometric model for a lost model region corresponding to a lost image region in a range image, a determination unit which determines whether or not a point on a geometric model corresponding to a pixel on the range image of the target object falls within the lost model region, a correction unit which corrects combinations of pixels on the range image and corresponding points which are determined to fall within the lost model region, and a calculation unit which calculates the position and orientation of the target object based on the corrected combinations of the pixels on the range image and points on the geometric model.

10 Claims, 6 Drawing Sheets

(56) References Cited

U.S. PATENT DOCUMENTS

| | | | |
|---|---|---|---|
| 6,993,450 B2 | 1/2006 | Takemoto et al. | |
| 7,092,109 B2* | 8/2006 | Satoh et al. | 356/620 |
| 7,420,556 B2 | 9/2008 | Fujiki | |
| 7,587,295 B2* | 9/2009 | Satoh | 702/150 |
| 7,664,341 B2 | 2/2010 | Takemoto et al. | |
| 7,848,903 B2 | 12/2010 | Aratani et al. | |
| 7,860,345 B2 | 12/2010 | Satoh et al. | |
| 8,509,523 B2* | 8/2013 | Schamp | 382/156 |
| 2010/0142826 A1 | 6/2010 | Kotake et al. | |
| 2010/0289797 A1 | 11/2010 | Tateno et al. | |
| 2010/0295924 A1 | 11/2010 | Miyatani et al. | |
| 2011/0116684 A1* | 5/2011 | Coffman et al. | 382/103 |
| 2011/0211066 A1 | 9/2011 | Fujiki | |

OTHER PUBLICATIONS

P.J. Besl, et al., "A Method for Registration of 3-D Shapes," IEEE Transactions on Pattern Analysis and Machine Intelligence, vol. 14, No. 2, pp. 239-256, Feb. 1992.

H. Inagaki, "Three-Dimensional Constrained Delaunay Triangulation Algorithm," IPSJ Study Report, Algorithm Study Group Report, pp. 41-48, 1994.

Y. Chen, "Object Modeling by Registration of Multiple Range Images," Proceedings of IEEE International Conference of Robotics and Automation, vol. 3, pp. 2724-2729, 1991.

H. Shimada, "A Method of Pose Estimation for a 3D Object," Proceedings of the 1996 General Conference of Electronics, Information and Communication Engineers, The Institute of Electronics Information and Communication Engineers, Mar. 11, 1996, p. 369.

International Search Report in PCT/JP2011/054677 mailed May 10, 2011.

* cited by examiner

POSITION AND ORIENTATION MEASUREMENT APPARATUS, POSITION AND ORIENTATION MEASUREMENT METHOD, AND PROGRAM

TECHNICAL FIELD

The present invention relates to a technique for measuring the position and orientation of a target object whose three-dimensional shape is given and, more particularly, to a position and orientation measurement technique for measuring the position and orientation of a target object based on a range image obtained by capturing an image of the target object.

BACKGROUND ART

Along with the development of robot technologies in recent years, robots perform complicated tasks, which, up until now, were performed manually. As an example of such complicated tasks, assembling processes of industrial products are known. Such a robot has to hold a component and to fit the component to another component by an end effecter such as a robot hand, so as to control the robot to perform assembling processes. For this purpose, a relative position and orientation between the component to be held or fit and the robot have to be measured. Then, a moving plan of the robot hand has to be designed based on the measurement result so as to control actuators required to actually drive the robot hand.

Conventionally, the position and orientation of the robot are measured using a camera or distance sensor mounted on the robot, and methods using a two-dimensional image and range image are typical. Especially, the method using a range image has following advantages compared to that using a two-dimensional image. That is, the method using a range image can directly obtain position information in an image capturing direction, can obtain geometric information even when a target object has poor texture information, and is insusceptible to a surrounding light source environment. For this reason, the method using a range image takes on increasing importance in practical applications such as product assembling in a factory.

As a method to estimate the position and orientation of an object in a captured scene from a range image, a method to fit a geometric model of the object to the range image predominates, many studies have been conventionally made. For example, non-patent reference 1 (P. J. Besl and N. D. McKay, "A method for registration of 3-D shapes," IEEE Transactions on Pattern Analysis and Machine Intelligence, vol. 14, no. 2, pp. 239-256, 1992.) discloses a method of measuring the position and orientation of an object by converting a range image into three-dimensional point cloud data, and fitting a three-dimensional model to the point cloud data (model fitting method). That is, the position and orientation are calculated by searching for neighboring planes of the three-dimensional model in association with respective points of the point cloud data based on approximate values of the position and orientation, and repeating optimization of the position and orientation so as to minimize a sum of distances between the points and planes.

The aforementioned model fitting method searches for correspondences between measurement data and a model, and minimizes differences between corresponding pairs. However, obviously wrong correspondence pairs are often detected due to causes such as noise of measurement data and errors of initial position and orientation estimated values. A method group called robust estimation which sets a small weight for such obvious errors ("outliers") to prevent outliers from adversely affecting the estimation result is used. As a typical method of the robust estimation, M-estimation is known.

Depending on the measurement principle of an image capturing apparatus which captures a range image, data may often be lost in the captured range image. For example, in a light-section method, light which is projected by an illumination apparatus onto a target object is observed by a camera from a direction different from the projection direction. At this time, a light projected region may be partially occluded by the target object itself, and may often not be observed by the camera. In such case, data of the range image is lost for the region on the object, which cannot be observed from the camera. FIGS. 1A and 1B show an example in which data of a range image is lost. FIG. 1A shows a range image obtained by capturing an image of a target object, and FIG. 1B shows, for example, regions such as concave portions when viewed from the surface of the target object, where data (distance values) are lost since depth values cannot be measured.

When a geometric model of the target object is to be fitted to such range image which suffers lost data, the range image and geometric model are often erroneously associated with each other. The concept of an association error will be described below with reference to FIG. 2. A sectional shape 201 is formed by cutting the geometric model by a plane parallel to the plane of drawing. A sectional shape 202 is that of a plane defined by a point cloud on a three-dimensional space corresponding to pixels of the range image. Also, a spatial region 203 represents a spatial region where distance values cannot be measured due to occlusion from the camera. As for a three-dimensional point cloud (a portion indicated by the broken line of the sectional shape 202), depth data of the range image are lost. A case will be examined below wherein, for example, of a measurement point cloud, a point on a model having a minimum distance from a point A is searched for as a corresponding point of the point A. Since the point A is located on the bottom surface of a concave portion of the sectional shape, it is desirably associated with a point on the bottom surface of the model such as a point B. However, in this case, a corresponding point of the point A having the shortest distance is a point C on the model, thus causing an association error. When the geometric model and measurement point cloud are erroneously associated with each other, since the influence of attempting to minimize distances between wrong correspondence pairs appears in position/orientation estimation calculations, thus lowering the position/orientation estimation accuracy.

Use of the aforementioned robust estimation cannot always reduce the adverse influence of wrong correspondence pairs. This is because distances between wrong correspondence pairs due to measurement losses are not always sufficiently larger than distances between correct correspondence pairs, and their degrees of contribution to the position/orientation estimation calculations are equivalent to those of the correct correspondence pairs.

SUMMARY OF INVENTION

The present invention has been made in consideration of the aforementioned problems, and provides a position and orientation measurement technique which can reduce an accuracy drop caused by lost measurement values of a range image when the position and orientation of an object in the range image are calculated.

According to one aspect of the present invention, there is provided a position and orientation measurement apparatus comprising: obtaining means for obtaining a range image of a target object captured by image capturing means; detection means for detecting a lost image region where distance values are not measured from the obtained range image; first search means for searching a geometric model which indicates a given three-dimensional shape of the target object for a lost model region corresponding to the detected lost image region; second search means for searching for combinations of pixels on the range image and corresponding points on the geometric model based on information indicating positions of the pixels on the range image, and information indicating positions of the points on the geometric model; determination means for determining whether or not each corresponding point on the geometric model detected by the second search means with respect to the pixel on the range image falls within the lost model region; correction means for, when the determination means determines that the corresponding point on the geometric model falls within the lost model region, correcting that combination of the pixel on the range image and the corresponding point on the geometric model detected by the second search means; and calculation means for calculating a position and an orientation of the target object based on the combinations of the pixels on the range image and the points on the geometric model, which are corrected by the correction means.

According to another aspect of the present invention, there is provided a position and orientation measurement method executed by a position and orientation measurement apparatus, comprising: an obtaining step of obtaining a range image of a target object captured by image capturing means; a detection step of detecting a lost image region where distance values are not measured from the range image obtained in the obtaining step; a first search step of searching a geometric model which indicates a given three-dimensional shape of the target object for a lost model region corresponding to the detected lost image region; a second search step of searching for combinations of pixels on the range image and corresponding points on the geometric model based on information indicating positions of the pixels on the range image, and information indicating positions of the points on the geometric model; a determination step of determining whether or not each corresponding point on the geometric model obtained in the second search step with respect to the pixel on the range image falls within the lost model region; a correction step of correcting, when it is determined in the determination step that the corresponding point on the geometric model falls within the lost model region, that combination of the pixel on the range image and the corresponding point on the geometric model obtained in the second search step; and a calculation step of calculating a position and an orientation of the target object based on the combinations of the pixels on the range image and the points on the geometric model, which are corrected in the correction step.

According to the present invention, a position and orientation measurement technique which can reduce an accuracy drop caused by lost measurement values of a range image when the position and orientation of an object in the range image are calculated can be provided.

Further features of the present invention will become apparent from the following description of exemplary embodiments (with reference to the attached drawings).

DESCRIPTION OF EMBODIMENTS

First Embodiment

A position and orientation measurement method of this embodiment extracts a region on a geometric model (to be referred to as a "lost model region" hereinafter) corresponding to a region where data (distance values) are lost on a range image (to be referred to as a "lost image region" hereinafter). Upon fitting the geometric model to the range image, the lost model region is excluded from a fitting processing target. Assume that the geometric model used in this embodiment is a triangular patch model which expresses a surface of an object as a set of triangular planes.

Assume that a pixel value of a pixel whose depth data is lost in a range image is set to be "0". Depending on the characteristics of a measurement apparatus which measures a range image (to be referred to as a "range image measurement apparatus" hereinafter), a pixel value of a lost portion does not always assume "0", but "0" is set as a special constant value which indicates that the value is not a normal depth value. Therefore, when a pixel value in a range image is equal to the special constant value, it is determined that measurement data of that pixel is lost; otherwise, it is determined that measurement data is not lost.

Figure 1B:
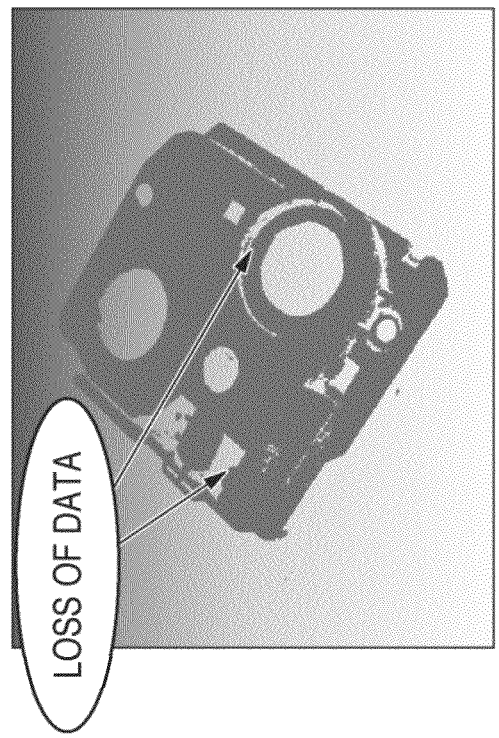
FIGS. 1A and 1B are views showing an example of lost measurement values of a range image.
Figure 1A:
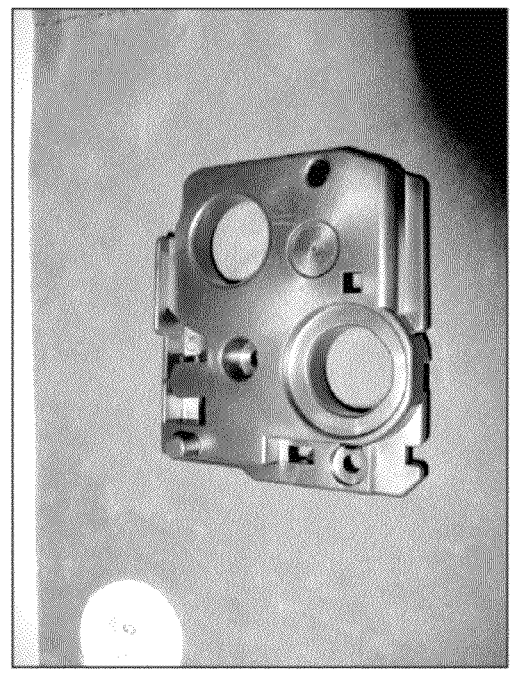
Figure 2:
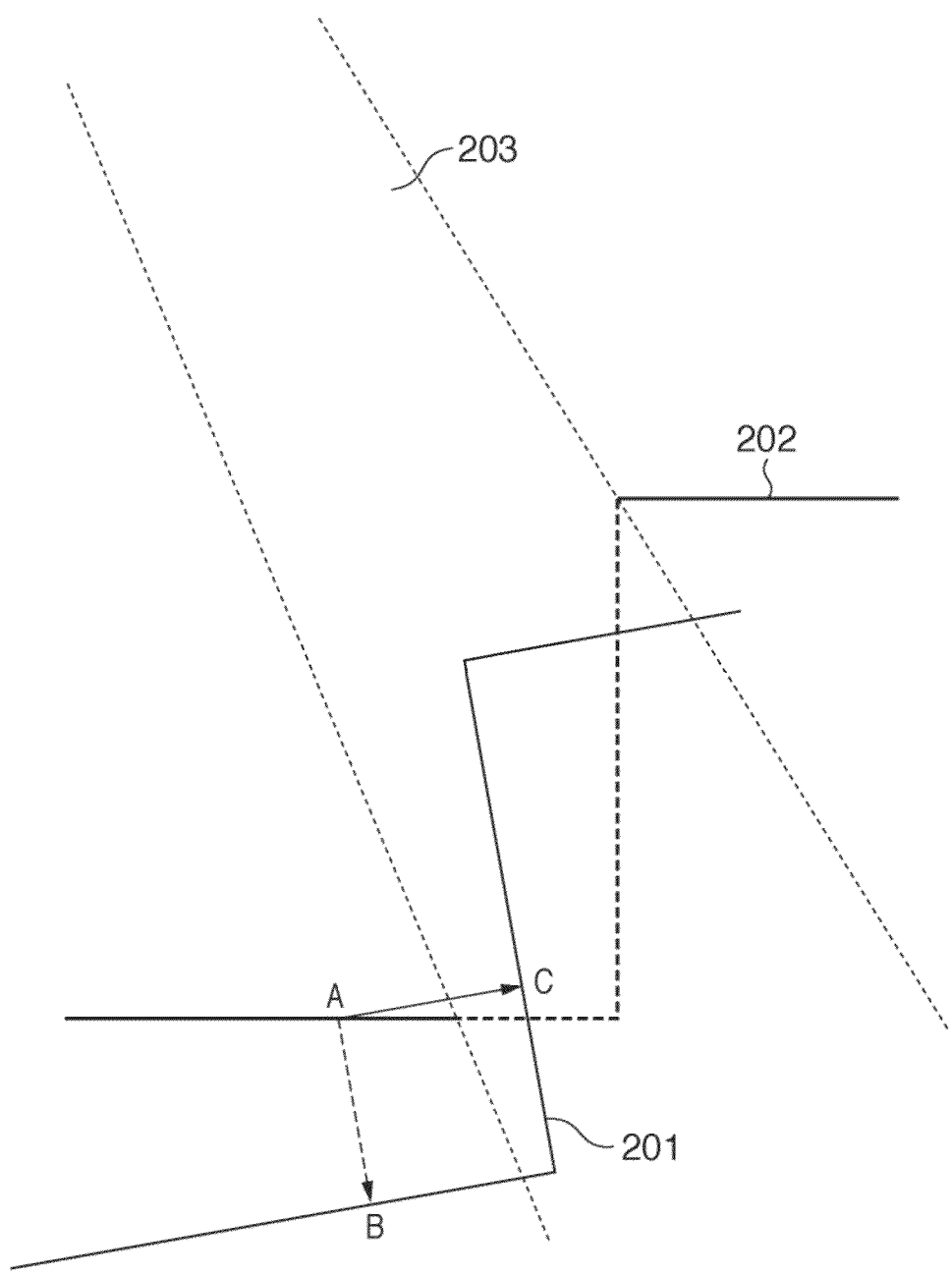
FIG. 2 is an exemplary view of an association error with a geometric model due to lost data of a range image.
Figure 3:
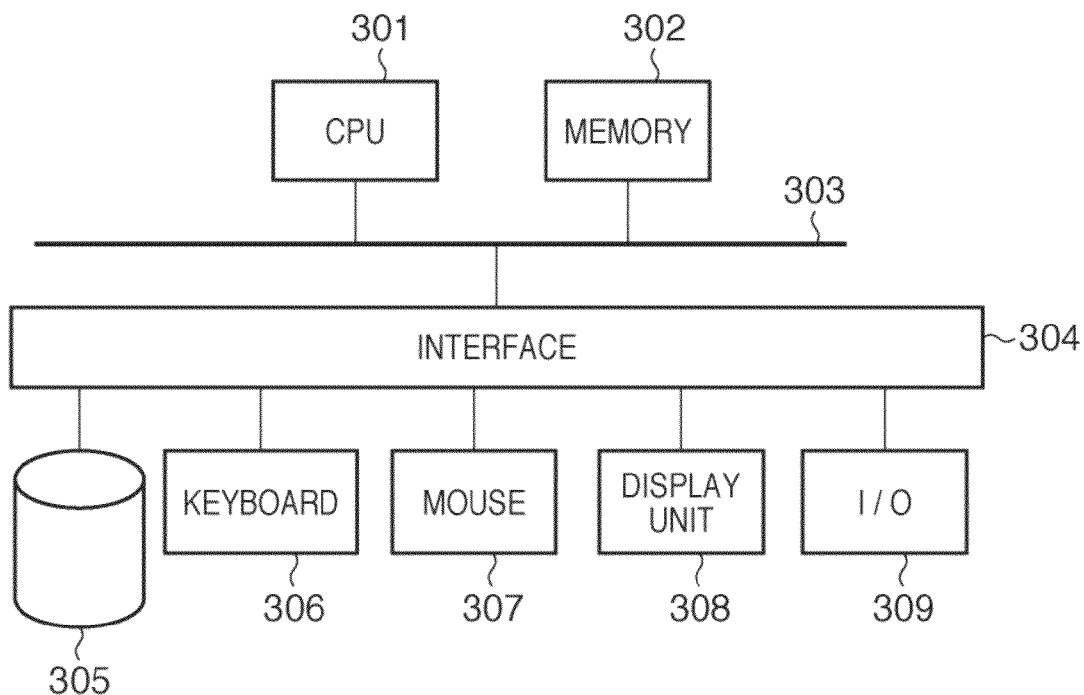
FIG. 3 is an exemplary block diagram for explaining the hardware arrangement of a position and orientation measurement apparatus according to an embodiment of the present invention.

The hardware arrangement of a position and orientation measurement apparatus according to the embodiment of the present invention will be described below with reference to FIG. 3. A CPU 301 controls the operation of the overall apparatus. A memory 302 stores programs and data used in the operation of the CPU 301. A bus 303 controls data transfer between respective modules. The bus 303 and respective devices are connected to an interface 304. An external storage device 305 stores programs and data to be loaded by the CPU 301. A keyboard 306 and mouse 307 serve as input devices used to launch a program and to designate an operation of the program. A display unit 308 displays the operation results of processes. A data input/output unit 309 can exchange data with an external apparatus. A range image measurement apparatus is connected to the position and orientation measurement apparatus via the data input/output unit 309.

Figure 4:
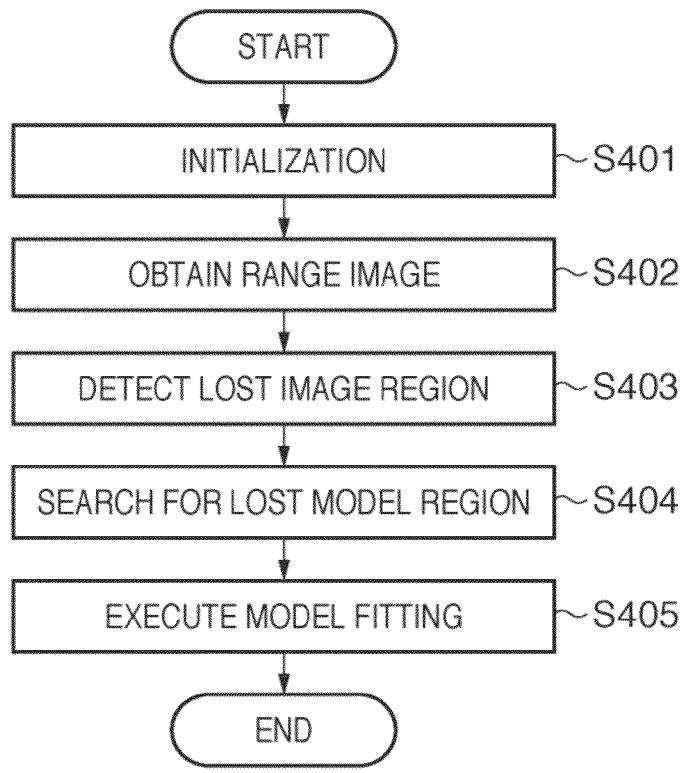
FIG. 4 is a flowchart for explaining the sequence of processing of a position and orientation measurement method according to the first embodiment.

The sequence of processing of a position and orientation measurement method according to the first embodiment will be described below with reference to FIG. 4. This processing is executed under the global control of the CPU 301. In step S401, the CPU 301 initializes data used in processing. More specifically, the CPU 301 loads geometric model data from the external storage device 305 onto the memory 302. The geometric model data is configured by identification numbers and coordinates of respective vertices of triangular patches, identification numbers of these triangular patches, and those of vertices which form each patch. Also, the CPU 301 inputs camera parameters (a principal point position and focal length) of an image capturing unit of a range image measurement apparatus from the range image measurement apparatus (not shown) connected to the data input/output unit 309. It is possible to calibrate in advance the camera parameters by a method disclosed in, for example, non-patent reference 2 (Z. Zhang, A flexible new technique for camera calibration, IEEE Transactions on Pattern Analysis and Machine Intelligence, vol. 22, no. 11, pp. 1330-1334, 2000.).

In step S402, the CPU 301 inputs range image data (to be also simply referred to as a "range image" hereinafter) measured by the range image measurement apparatus (not shown) connected to the data input/output unit 309, and stores it in the memory 302. Note that an arbitrary unit for capturing a range image can be used. For example, a range image can be captured by a light-section method or stereo method.

In step S403, the CPU 301 detects regions where depth values are lost on the range image, that is, lost image regions. More specifically, the CPU 301 checks whether or not a pixel value of each pixel is "0". If the pixel value is "0", since the CPU 301 determines that a depth value is lost, it adds the coordinates of that pixel to data of a lost image region assured on the memory 302.

In step S404, the CPU 301 searches for lost model regions as regions on the geometric model, which correspond to the lost image regions detected in step S403. Details of this step will be described later. Finally, in step S405 the CPU 301 fits the geometric model to the range image obtained in step S402 to estimate the position and orientation of the target object. Details of this step will also be described later.

(Processing of Lost Model Region Search Process)

Figure 5:
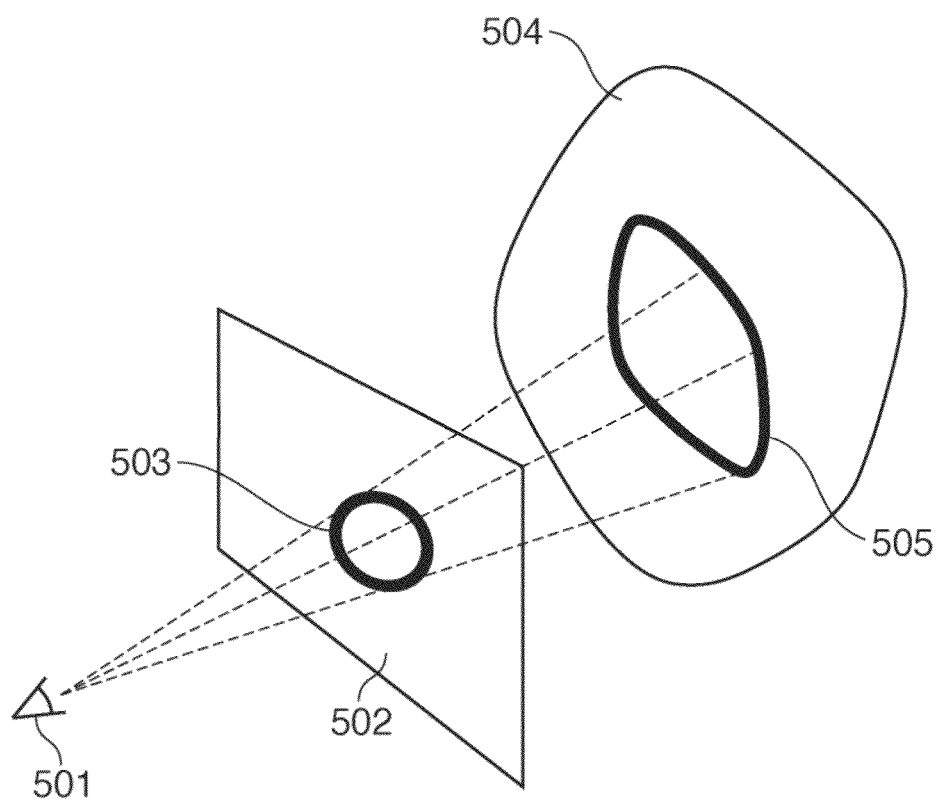
FIG. 5 is a view for explaining the processing contents of a lost model region search process.

Details of the lost model region search process (step S404) will be described below with reference to FIG. 5. Referring to FIG. 5, a viewpoint position 501 indicates a position with reference to a position and orientation at which the range image measurement apparatus is arranged, an image plane 502 indicates a plane on the range image, and a lost image region 503 indicates that on the image plane 502. In the lost model region search process, as shown in FIG. 5, the lost image region 503 is projected from the viewpoint position 501 onto a geometric model 504 which represents a given three-dimensional shape of a target object. A region that intersects the geometric model 504 first (a region projected onto the geometric model 504) is extracted as a lost model region 505. Assume that the relative position and orientation between the geometric model 504 and viewpoint position 501 approximately match those between a camera of the image capturing unit of the range image measurement apparatus and the target object.

As the first step of the lost model region search process, the CPU 301 approximately calculates the relative position and orientation between the camera of the image capturing unit and the target object. In this step, an arbitrary calculation method can be used. For example, a method of Japanese Patent Laid-Open No. 01-009307 can be used.

As practical processing for extracting the lost model region 505, regions obtained by projecting quadrate regions on the range image (image plane 502), which correspond to respective pixels of the lost image region 503, onto respective triangular patches included in the geometric model 504 are calculated. Letting $\vec{r}1$, $\vec{r}2$, and $\vec{r}3$ be coordinates of three vertices of one triangular patch, a region obtained by projecting a quadrate region corresponding to one pixel on the range image (image plane 502) onto the triangular patch has a polygonal shape having the number of vertices ranging from 3 to 6, and vertex coordinates are expressed by:

$$\vec{m}_1 = u_1\vec{r}_1 + v_1\vec{r}_2 + w_1\vec{r}_3 \qquad (1)$$
$$\vec{m}_2 = u_2\vec{r}_1 + v_2\vec{r}_2 + w_2\vec{r}_3$$
$$\vdots$$
$$\vec{m}_i = u_i\vec{r}_1 + v_i\vec{r}_2 + w_i\vec{r}_3$$

where i is an integer ranging from 3 to 6, $u_k+v_k+w_k=1$, $u_k\epsilon[0, 1]$, $v_k\epsilon[0, 1]$, and $w_k\epsilon[0, 1]$ (k=1, 2, ..., i). The extracted lost model region 505 is stored in the memory 302 as identification numbers of triangular patches and coefficient sets ($u_k$, $v_k$, $w_k$) (k=1, 2, ..., i) which express each vertex of a pixel region projected onto each triangular patch in the form of formulas (1). Since a plurality of lost pixels are likely to be projected onto one triangular patch, one or a plurality of regions are registered per triangular patch.

(Details of Model Fitting Process)

Details of the model fitting process (step S405) will be described below with reference to FIG. 6A. In step S601, the CPU 301 calculates combinations (nearest neighbor point pairs) which yield nearest neighbor (minimum) distances between pixels on the range image and points on the geometric model. The CPU 301 searches for each combination which yields the minimum distance between the pixel on the range image and the point on the geometric model based on information indicating the position of the pixel on the range image and information indicating the position of the point on the geometric model. The CPU 301 stores the calculated nearest neighbor point pairs in the memory 302 as a nearest neighbor point pair list. More specifically, the CPU 301 selects a sample pixel as a candidate of the nearest neighbor point pair from those on the range image. The sample pixel may be selected one by one from the range image, or may be selected by decimating an image region for every predetermined number of pixels (a plurality of pixels, for example, 5 pixels). However, a measurement lost pixel is not selected as a sample pixel.

Next, the CPU 301 calculates position coordinates of a sample point $\vec{p}$ on a three-dimensional space, which corresponds to the sample pixel, on a coordinate system of the target object. The CPU 301 implements this processing as follows. That is, the CPU 301 calculates the three-dimensional coordinates on a coordinate system of the image capturing unit from two-dimensional coordinates and a pixel value of the sample pixel based on the camera parameters of the image capturing unit of the range image measurement apparatus, which are loaded in step S401. Then, the CPU 301 converts the coordinates on the coordinate system of the image capturing unit into those on the coordinate system of the target object based on the approximate relative position and orientation between the image capturing unit and target object, which are calculated in step S403.

Subsequently, the CPU 301 calculates a nearest neighbor point on the geometric model, which corresponds to the sample point $\vec{p}$. A minimum distance d between the sample point $\vec{p}$ and a triangular patch t defined by three vertices $\vec{r}1$, $\vec{r}2$, and $\vec{r}3$ is expressed by:

$$d(\vec{p}, t) = \min_{u+v+w=1} \|u\vec{r}_1 + v\vec{r}_2 + w\vec{r}_3 - \vec{p}\| \qquad (2)$$

for $u \in [0, 1]$, $v \in [0, 1]$, and $w \in [0, 1]$. Assuming that a geometric model T is configured by N triangular patches $t_1, \ldots, t_N$, a distance between the sample point $\vec{p}$ and the nearest neighbor point on the geometric model T is expressed by:

$$d(\vec{p}, T) = \min_{i \in \{1, \ldots, N\}} d(\vec{p}, t_i) \qquad (3)$$

In order to calculate a nearest neighbor point of the sample point, the CPU 301 calculates minimum distances between the sample point and respective triangular patches and sets of coefficients (u, v, w) that represent the coordinates of nearest neighbor points. Then, the CPU 301 searches all the triangular patches for a triangular patch having the smallest minimum distance from the sample point and a set of coefficients (u, v, w).

The processing of the nearest neighbor point pair search process (step S601) have been described. The processing result is recorded in the memory 302 as a list which enumerates, for all the sample points, the three-dimensional coordinates of each sample point, an identification number of a triangular patch where a nearest neighbor point on the geometric model is located, and a set of coefficients (u, v, w) which express the coordinates of the nearest neighbor point.

In step S602, the CPU 301 checks in association with each nearest neighbor point pair whether or not the nearest neighbor point on the geometric model side is located within the lost model region. More specifically, the CPU 301 searches the lost model region data calculated in step S404 for data in which an identification number of a triangular patch matches that of a triangular patch where the nearest neighbor point on the geometric model side is located. Next, the CPU 301 checks if uvw coordinates which express the nearest neighbor point are included in one or a plurality of polygonal regions on a uvw space registered in that triangular patch.

If the checking result in step S602 is "true" in step S603, the process advances to step S604; if the checking result in step S602 is "false", the process advances to step S605.

In step S604, the CPU 301 corrects the nearest neighbor point pair list stored in the memory 302. That is, when the nearest neighbor point on the geometric model side is located within the lost model region, the CPU 301 deletes the corresponding nearest neighbor point pair data, thereby correcting the nearest neighbor point pair list stored in the memory 302.

On the other hand, the CPU 301 checks in step S605 whether or not the processes in steps S602 to S604 are completed for all the nearest neighbor point pairs. If it is determined that the processes are completed, the process advances to step S606; if it is determined that corresponding point pairs to be processed still remain, the process returns to step S602 to repeat the same processes.

In step S606, the CPU 301 calculates the position and orientation of the model so as to minimize the sum total of distances between nearest neighbor point pairs registered in the nearest neighbor point pair list, and sets the calculation results as the position and orientation of the target object. Three-dimensional coordinates on the coordinate system of the image capturing unit of the range image measurement apparatus can be converted into three-dimensional coordinates (x, y, z) on the coordinate system of the target object using a position/orientation s of the target object. In this case, the position and orientation of the measurement target object are expressed in six degrees of freedom. That is, s is a six-dimensional vector, which includes three elements that represent the position of the measurement target object, and three elements that represent the orientation of the measurement target object. Assume that a certain point on the image capturing unit coordinate system is converted into a point $(x_0, y_0, z_0)$ on the target object coordinate system based on the approximate position and orientation of the target object, which are calculated in step S403. The coordinates (x, y, z) change depending on the position and orientation of the target object, and can be approximated using a linear Taylor expansion in the vicinity of $(x_0, y_0, z_0)$, as described by:

$$x \approx x_0 + \sum_{i=1}^{6} \frac{\partial x}{\partial s_i} \Delta s_i \qquad (4)$$

$$y \approx y_0 + \sum_{i=1}^{6} \frac{\partial y}{\partial s_i} \Delta s_i$$

$$z \approx z_0 + \sum_{i=1}^{6} \frac{\partial z}{\partial s_i} \Delta s_i$$

An equation on the target object coordinate system of a triangular patch plane where a nearest neighbor point on the geometric model side of a certain nearest neighbor point pair stored in the memory 302 is located is described by $ax+by+cz=e$ ($a^2+b^2+c^2=1$, and a, b, c, d, and e are constants). Assume that (x, y, z) converted using correct s satisfies the equation of plane $ax+by+cz=e$ ($a^2+b^2+c^2=1$). Substitution of formulas (4) into the equation of plane yields:

$$a\sum_{i=1}^{6} \frac{\partial x}{\partial s_i} \Delta s_i + b\sum_{i=1}^{6} \frac{\partial y}{\partial s_i} \Delta s_i + c\sum_{i=1}^{6} \frac{\partial z}{\partial s_i} \Delta s_i = e - q \qquad (5)$$

where $q = ax_0 + by_0 + cz_0$ (constant).

Since equation (5) holds for all the nearest neighbor point pairs, simultaneous linear equations about $\Delta s_i$ hold, as described by:

$$\begin{bmatrix} a_1\frac{\partial x_1}{\partial s_1}+b_1\frac{\partial y_1}{\partial s_1}+c_1\frac{\partial z_1}{\partial s_1} & a_1\frac{\partial x_1}{\partial s_2}+b_1\frac{\partial y_1}{\partial s_2}+c_1\frac{\partial z_1}{\partial s_2} & \ldots & a_1\frac{\partial x_1}{\partial s_6}+b_1\frac{\partial y_1}{\partial s_6}+c_1\frac{\partial z_1}{\partial s_6} \\ a_2\frac{\partial x_2}{\partial s_1}+b_2\frac{\partial y_2}{\partial s_1}+c_2\frac{\partial z_2}{\partial s_1} & a_2\frac{\partial x_2}{\partial s_2}+b_2\frac{\partial y_2}{\partial s_2}+c_2\frac{\partial z_2}{\partial s_2} & \ldots & a_2\frac{\partial x_2}{\partial s_6}+b_2\frac{\partial y_2}{\partial s_6}+c_2\frac{\partial z_2}{\partial s_6} \\ \vdots & \vdots & \vdots & \vdots \end{bmatrix} \quad (6)$$

$$\begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} e_1 - q_1 \\ e_2 - q_2 \\ \vdots \end{bmatrix}$$

In this case, equations (6) are expressed as:

$$J\Delta s = E \quad (7)$$

Based on equation (7), $\Delta s$ is calculated using a generalized inverse matrix $(J^T \cdot J)^{-1} \cdot J^T$ of a matrix J. However, since a measurement point cloud of the range image includes many outliers due to noise, a robust estimation method to be described below is used. In general, in measurement point cloud data as an outlier, an error e-q becomes large. For this reason, such data has a large degree of contribution to the simultaneous equations (6) and (7), and the accuracy of $\Delta s$ obtained as a result of these equations lowers. Hence, a small weight is given to data having a large error e-q, and a large weight is given to data having a small error e-q. The weight can be given by a Tukey function, which is described by:

$$w(e-q) = \begin{cases} (1-((e-q)/c)^2)^2 & |e-q| \le c \\ 0 & |e-q| > c \end{cases} \quad (8)$$

where c is a constant. Note that a function used to give a weight need not always be the Tukey function, and other functions such as a Huber function may be used as long as they give a small weight to data with a large error and a large weight to data with a small error. Let $w_i$ be a weight corresponding to each data. In this case, a weighting matrix W is defined by:

$$W = \begin{bmatrix} w_1 & & & 0 \\ & w_2 & & \\ & & \ddots & \\ 0 & & & w_{N_c} \end{bmatrix} \quad (9)$$

The weighting matrix W is a square matrix in which all components assume "0" except for diagonal components, which assume weights $w_i$. $N_c$ is the number of nearest neighbor point pairs (except for corresponding point pairs including the point on the lost model region). Using this weighting matrix W, equation (7) is modified like:

$$WJ\Delta s = WE \quad (10)$$

A correction value $\Delta s$ is calculated by solving equation (10) like:

$$\Delta s = (J^T W J)^{-1} J^T W E \quad (11)$$

The approximate values of the position and orientation of the model are corrected by the correction value $\Delta s$ calculated in this way, and the results are stored in the memory 302 or are output to the external apparatus via the data input/output unit 309. Note that the aforementioned position and orientation optimization calculation method is based on a Gauss-Newton method. However, the present invention is not limited to this, and other methods such as a Levenberg-Marquardt method and steepest descent method may be used.

The sequence of the processing of the position and orientation measurement apparatus according to this embodiment has been described. According to this embodiment, regions where depth values are lost on the range image can be excluded from the processing for estimating the position and orientation of the target object. As a result, a risk to use bad data in the processing for calculating the position and orientation of the target object can be lightened, thus reducing position and orientation errors.

Especially, the measurement lost regions on the range image can be surely detected by the simple checking processing for inspecting whether or not a pixel value assumes a predetermined value. On the other hand, the aforementioned robust estimation method adjusts the degrees of contribution of outliers based only on the magnitudes of errors. In this embodiment as well, the robust estimation is used. However, processing for assuring a region which is not used in calculations on the geometric model side by positively using lost information of the range image is executed before the robust estimation. Errors caused by measurement losses do not always assume larger values than errors due to other causes. Therefore, the robust estimation method alone cannot always lower the degrees of contribution of measurement lost data. That is, the method of the present embodiment can enhance the calculation accuracy by excluding outliers more surely than a case using only the robust estimation method.

Modification 1-1

The embodiment of the present invention is not limited to the above description, and allows various modifications. For example, in the above description, the position and orientation calculations of the target object are executed once in the lost model region search process (S404) and model fitting process (S405). However, the gist of the present invention is not limited to such specific example, and the estimation accuracy of the position and orientation can be asymptotically enhanced by repeating these processes. In this case, after completion of step S405, the CPU 301 checks whether or not the number of repetition times reaches a predetermined value. If the number of repetition times reaches the predetermined value, the entire processing ends; otherwise, the process returns to step S404 to repeat the same processes.

Alternatively, the CPU 301 calculates a model fitting error after completion of step S405, and compares a magnitude relation with a predetermined threshold. If the error is less than the threshold, the entire processing ends. If the error is equal to or larger than the threshold, the process returns to step S404 to repeat the same processing. In this case, the model fitting error assumes a value obtained by adding all distances between the nearest neighbor point pairs for all the nearest neighbor point pairs. With this method, since the estimation accuracy of the lost model regions can be higher as that of the position and orientation becomes higher, the influence of measurement losses can be eliminated.

Modification 1-2

In the above description, the nearest neighbor points on the lost model regions are excluded, and the position and orientation estimation processing is then executed. However, the method of excluding the lost model regions from the processing target is not limited to this. For example, a region on each triangular patch which is determined to be included in the lost region in the lost model region search process (step S404) may be excluded from the nearest neighbor point pair search processing target in the model fitting process (step S405).

Alternatively, in place of excluding each nearest neighbor point pair in the lost model region from the processing target, a model obtained by excluding the lost model regions from the geometric model may be generated, and may be used as processing target data of the model fitting process (step S405). However, in this case, the need for the processes for checking if each nearest neighbor point is included in the lost model region and excluding the nearest neighbor point pair (steps S602 to S605) can be obviated. This is because since the lost model regions are removed from the geometric model, the nearest neighbor point is unlikely to be located within the lost model region.

As a method of excluding the lost model regions from the geometric model, for example, the surface of the patch model can be re-divided using an edge on the geometric model, which corresponds to a boundary of the lost image region, as a side of a new plane patch. The patch model re-division processing can be implemented as follows. That is, vertices of the lost model region which are projected onto original plane patch planes, and intersections between the boundaries of the lost model region and the sides of plane patches are added as vertices of new patches. Then, patches are generated by Delaunay division according to a method described in non-patent reference 3 (Hiroshi Inagaki, Kokichi Sugihara, Three-dimensional Constrained Delaunay Triangulation Algorithm, IPSJ Study Report, AL, Algorithm Study Group Report, 94 (26), pp. 41-48, 1994.) under a constraint that a side of the original plane patch and that of the lost model region are used as those of re-divided patches. Using the method of this modification, since the position and orientation of the target object can be estimated without reducing the number of nearest neighbor point pairs, the position and orientation can be calculated more accurately.

Modification 1-3

In step S404, the lost model region on each triangular patch is detected as a polygon on the coordinate system with reference to the two sides of that triangular patch. However, the lost model region expression method is not limited to this. For example, two-dimensional texture coordinates may be assigned in advance to vertices of each triangular patch like in model data frequently used in computer graphics, so as to express the lost model region using the texture coordinate system. Furthermore, texture images may also be assigned to each triangular patch in addition to the texture coordinates, so as to store the lost model region data as image data. More specifically, pixel values of pixels on a texture image corresponding to the lost model region are set to be "0", and pixel values of other regions are set to be "1". In the model fitting process (step S405), the pixel value of the texture image corresponding to a point on the geometric model of a nearest neighbor point pair is referred to, and if the pixel value=0, the corresponding nearest neighbor point pair is excluded from the position and orientation calculations of the target object.

Modification 1-4

In the above description, each lost image region is handled as a set of pixels. The configuration of the lost image region data is not limited to this, and it may be approximated. For example, a region group formed by connecting regions where depth data are lost on the range image may be detected, and a set of closed regions such as polygons or ellipses which include respective connected regions may be used as the lost image region. In this case, regions obtained by projecting the respective closed regions onto the geometric model from the viewpoint of the image capturing unit of the range image measurement apparatus are used as lost model regions. With this method, although the geometric accuracy of each lost model region lowers, the processing load required to calculate the lost model region can be reduced.

Modification 1-5

The lost model region may also be approximated by setting, for example, it to have geometric elements of the geometric model as units in place of the shape intact obtained by projecting the lost image region. For example, when the geometric model is configured by triangular patches, the lost model region can be set using triangular patches as units. In this case, a geometric element of the geometric model with which a line segment that connects the viewpoint of the range image measurement apparatus and a lost pixel intersects first may be extracted as a lost model region. Alternatively, a geometric element included in a cone obtained by projecting the connected region of modification 1-4 from the viewpoint of the image capturing unit onto the three-dimensional space may be extracted as a lost model region. With this method, although the geometric accuracy of the lost model region becomes low, geometric elements included in the lost model region can be excluded from processing targets of the model fitting process, and the processing load can be reduced.

Modification 1-6

The configuration of data of the geometric model is not limited to a triangular patch, and the following data can be applied.
(1) a line segment group: $u\vec{r}_1+(1-u)\vec{r}2$ (where $\vec{r}_1$ and $\vec{r}_2$ are vectors which represent the coordinates of the end points of a line segment)
(2) a parametric curve (x(u), y(u), z(u))
(3) a parametric curved surface (x(u, v), y(u, v), z(u, v))

In any of these cases, as a result of detection of intersections between a cone formed by projecting the lost image region onto the three-dimensional space and the geometric model, the lost model region can be described as a space specified by parameters u and (u, v). Also, the position on the geometric model side of the nearest neighbor point pair can be described using parameters u and (u, v). Therefore, by checking whether or not the nearest neighbor point on the geometric model side is included in a parameter space that specifies the lost model region, the lost region can be excluded from the model fitting target. Note that even when data of the geometric model adopts the configuration of any of the above cases, the nearest neighbor point can be calculated by the method disclosed in non-patent reference 1.

Modification 1-7

The algorithm for fitting the model to the range image is not limited to the aforementioned method and, for example, a method disclosed in non-patent reference 4 (Y. Chen, G. Medioni, Object modeling by registration of multiple range images, Proceedings of IEEE International Conference on Robotics and Automation, vol. 3, pp. 2724-2729, 1991.) can be used. Also, geometric features used in the model fitting processing are not limited to points. For example, the position and orientation of the target object may be estimated by fitting of edges (roof edges or jump edges) extracted from the range image and those extracted from the model. Even when the edges are used, whether or not an edge on the geometric model is included in the lost model region is checked. If the edge is included, that edge can be excluded from the fitting processing target.

Second Embodiment

In the first embodiment, lost model regions are completely excluded from the arithmetic processing (position and orientation calculations) for estimating the position and orientation of the target object. In this embodiment, in the arithmetic processing for estimating the position and orientation, the degrees of contribution of the lost model regions are set to be relatively lower than the geometric model regions other than the lost model regions, thereby reducing errors caused by measurement losses of the range image. In this case, the degree of contribution of each lost model region is set as the weight ($w_i$) of the weighting matrix W given by equation (9). Assume that the number $N_c$ of nearest neighbor points includes corresponding point pairs on the lost model regions.

The sequence of the overall processing of this embodiment is the same as that of the first embodiment except for the model fitting process (step S405). The sequence of the processing in the model fitting process according to the second embodiment will be described below with reference to FIG. 6B.

Figure 6A:
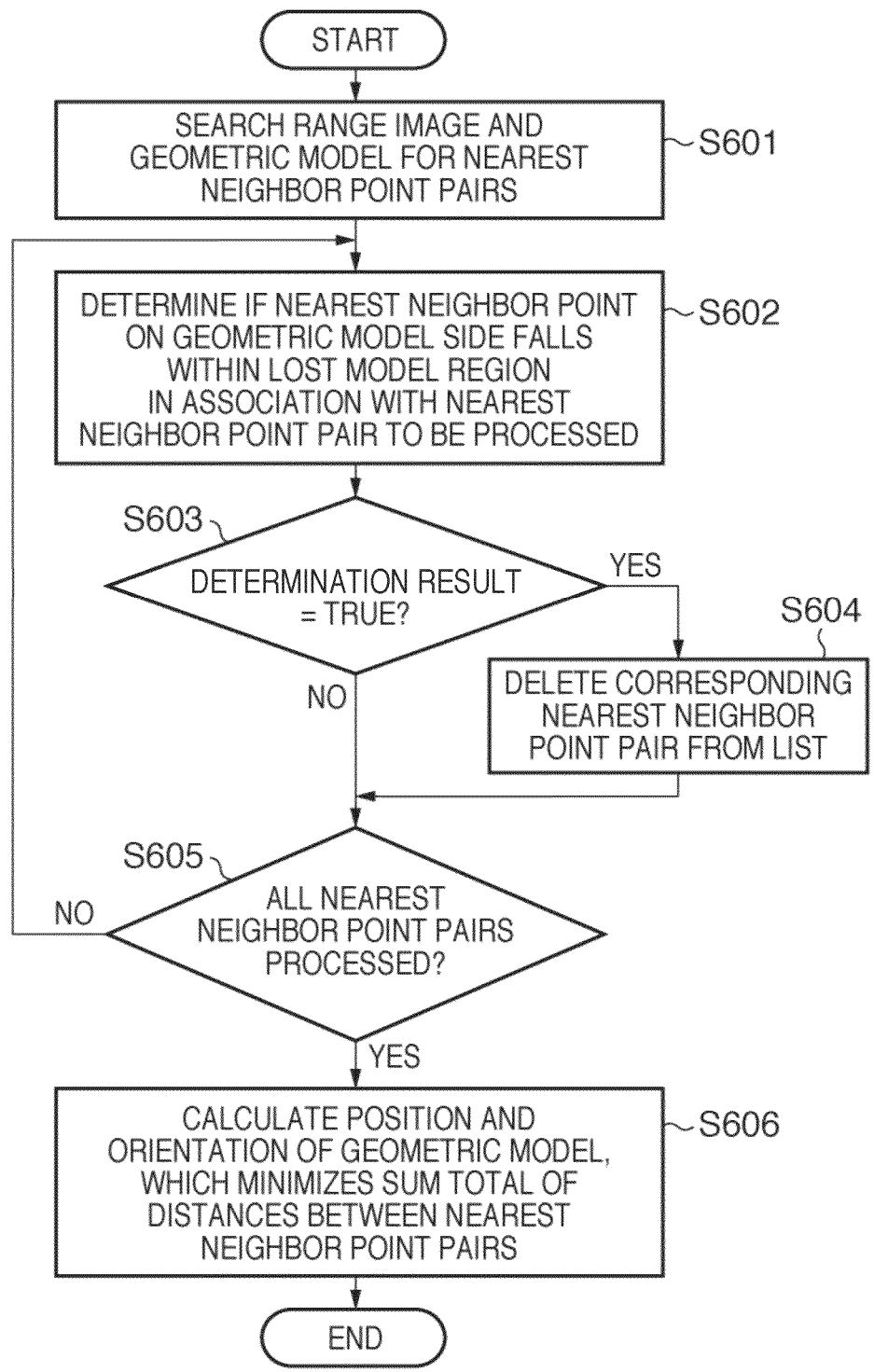
FIG. 6A is a flowchart showing the sequence of a model fitting process according to the first embodiment.
Figure 6B:
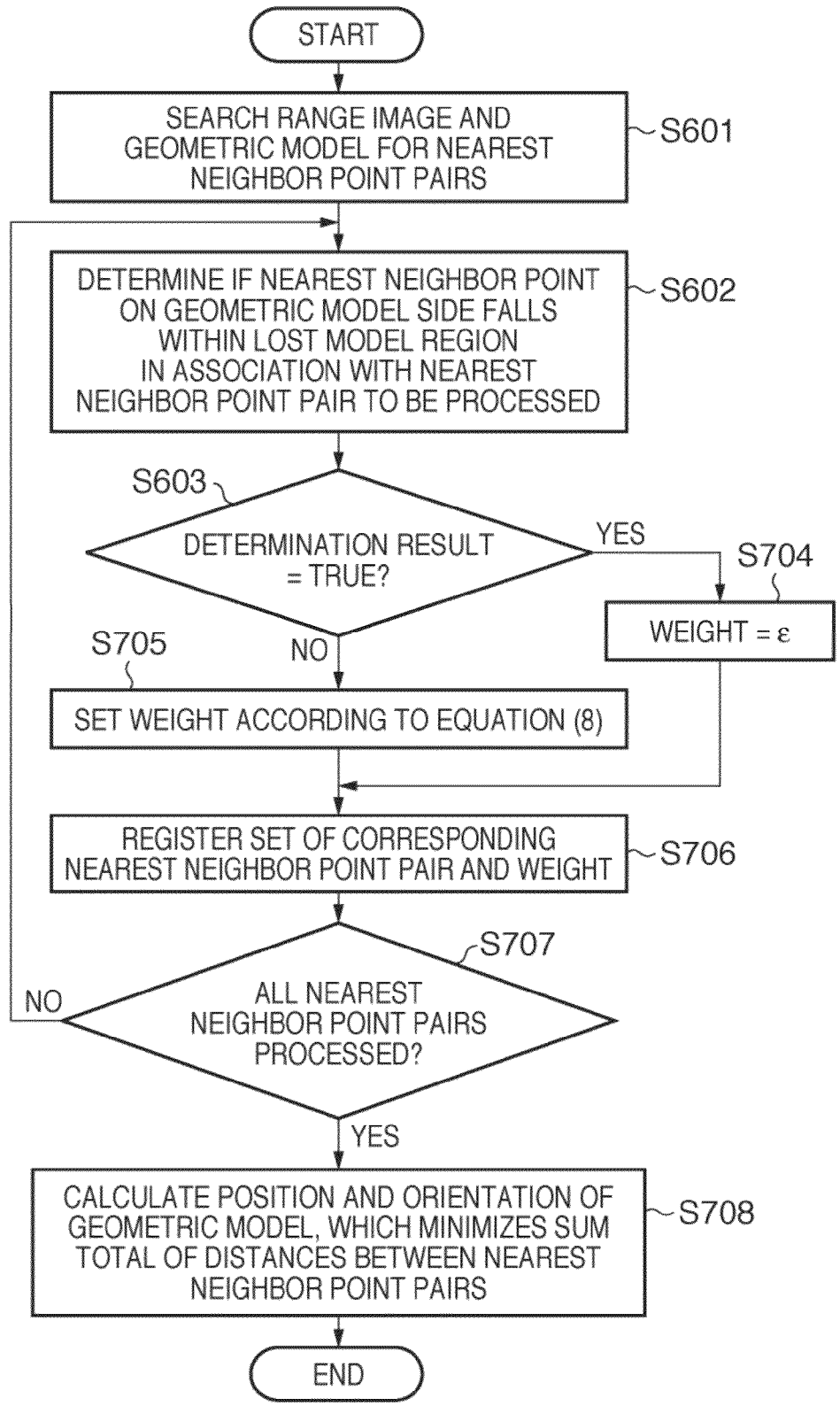
FIG. 6B is a flowchart showing the sequence of a model fitting process according to the second embodiment.

Since steps S601 to S603 in FIG. 6B are the same as steps S601 to S603 in FIG. 6A, a description thereof will not be repeated. If it is determined that a nearest neighbor point detected in step S601 falls within the lost model region (YES in step S603), the CPU 301 sets a predetermined constant $\epsilon$ (first weight) in a distance between the nearest neighbor point pair as the weight $w_i$ (S704). The constant $\epsilon$ is, for example, a positive decimal number close to "0". When a nearest neighbor point on the geometric model side is included in the lost model region, data of the corresponding nearest neighbor point pair are corrected by setting the predetermined constant $\epsilon$ (first weight).

On the other hand, if it is determined that the nearest neighbor point falls outside the lost model region (NO in step S603), the process advances to step S705, and the CPU 301 sets a weight $w_i$ as a second weight in the distance between the nearest neighbor point pair according to equation (8) (S705). If the nearest neighbor point on the geometric model side falls outside the lost model region, the data of the corresponding nearest neighbor point pair are corrected by setting the second weight. By setting the second weight set in step S705 to be larger than the first weight set in step S704, the influence of the nearest neighbor point included in the lost model region on the calculation result (degree of contribution) can be reduced upon calculating the measurement values of the position and orientation of the target object. Note that in order to reduce the degree of contribution of the nearest neighbor point included in the lost model region, the nearest neighbor point included in the lost model region can be multiplied by a relatively smaller weight than that falling outside the lost model region. For this reason, either one of steps S704 and S705 may be executed.

In step S706, the CPU 301 registers a set of the weight and the data of the nearest neighbor point pair in the memory 302. Then, the CPU 301 repeats the aforementioned processes until processes for setting weights for all the nearest neighbor point pairs are completed (NO in step S707). If the processes for setting weights for all the nearest neighbor point pairs are complete (YES in step S707), the process advances to step S708.

In step S708, the CPU 301 calculates the position and orientation of the geometric model which minimizes the sum total of values obtained by multiplying the distances between the nearest neighbor point pairs by the weights. More specifically, the CPU 301 corrects the approximate values of the position and orientation of the geometric model using a correction value $\Delta S$ of the position and orientation calculated according to equation (11), and stores the calculation results (position and orientation data) of the corrected position and orientation of the geometric model in the memory 302. Alternatively, the position and orientation data are output to an external apparatus via the data input/output unit 309 under the control of the CPU 301.

According to this embodiment, by setting a lower weight for the nearest neighbor point included in the lost model region without excluding that point, data which does not actually correspond to a lost portion can be prevented from being erroneously excluded from the position/orientation estimation processing. Especially, when the accuracy of the approximate position and orientation of the target object is expected to be low, this effect becomes large. Note that various modifications described in the first embodiment can also be applied to this embodiment, and effects of these modifications can be attained.

Third Embodiment

In the first embodiment, lost model regions are completely excluded from the arithmetic processing (position and orientation calculations) for estimating the position and orientation of the target object. In the second embodiment, errors caused by measurement losses of the range image are eliminated by setting relatively lower degrees of contribution of lost model regions than geometric model regions other than the lost model regions. These methods are not exclusive methods, and they can be used together.

For example, when the position and orientation estimated values of the target object are corrected by repeating the lost model region search process (S404) and model fitting process (S405), as described in modification 1-1, the two methods can be combined. For example, of the predetermined number of repetition times (2M: M is a natural number), the method of the second embodiment can be applied to the former half repetition times, and the method of the first embodiment can be applied to the latter half repetition times. At this time, after the arithmetic processing for estimating the position and orientation based on the method of the second embodiment is repeated the predetermined number of times, that for estimating the position and orientation based on the method of the first embodiment can be executed. For example, the CPU 301 measures the number of repetition times of the arithmetic processing for estimating the position and orientation based on the method of the second embodiment. Then, the CPU 301 can control to switch the arithmetic processing methods so that after the arithmetic processing is repeated the predetermined number of times, that for estimating the position and orientation based on the method of the first embodiment is executed. Alternatively, the CPU 301 checks whether or not the sum total of the distances between the nearest neighbor points becomes less than a predetermined threshold in the arithmetic processing based on the method of the second embodiment. Then, the CPU 301 can control to switch the arithmetic processing methods so that after the sum total becomes less than the threshold, the arithmetic processing for estimating the position and orientation based on the method of the first embodiment is executed.

As a combination of the methods of the first and second embodiments, for example, the method of the first embodiment may be applied to former half repetition times of the predetermined number of repetition times (2M: M is a natural number), and the method of the second embodiment may be applied to the latter half repetition times.

According to this embodiment, in a stage in which the accuracy of the position and orientation of the target object is low, a model region which does not correspond to a lost portion can be prevented from being erroneously excluded from the position and orientation estimation calculations, and in a stage in which the accuracy of the position and orientation is improved, the influence of data losses can be reliably excluded. For this reason, by combining the two different methods that eliminate the influence of lost regions, the accuracy of the position and orientation estimation (position and orientation calculations) can be more improved.

Fourth Embodiment

In the first to third embodiments, the lost model region 505 is set as that on the surface of the geometric model 504, but it may be a spatial region on the coordinate system of the geometric model 504. For example, a set of quadrangular pyramids formed by projecting regions on the range image of respective pixels which belong to the lost image region 503 may be set as a lost model region. Alternatively, as in modification 1-4, a lost model region may be configured by cones formed by projecting polygons or ellipses that include image regions where data are lost onto the three-dimensional space.

In this case, when a nearest neighbor point on the geometric model side of the nearest neighbor point pair is included any one of cones which configure the lost model region, that nearest neighbor point pair is excluded from a target of the position and orientation estimation processing of the target object. Alternatively, as described in the second embodiment, the degree of contribution of that nearest neighbor point pair is set to be low. Likewise, when features used in the model fitting process are other than points (for example, edges are used), if each feature is included in any one of cones that configure the lost model region, that feature can be excluded from the target of the fitting processing. Alternatively, as described in the second embodiment, the degree of contribution of that feature can be set to be low.

In general, when the geometric model is a curve or curved surface expressed by an implicit function or is expressed by metaballs, it is difficult to express a region on a model surface using parameters. However, this embodiment can be applied even to such geometric model. Furthermore, this embodiment can be applied when the geometric model is expressed by a three-dimensional point cloud. That is, when each individual three-dimensional point is included in any one of cones that configure the lost model region, that point can be excluded from the target of the model fitting processing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-043059, filed Feb. 26, 2010, which is hereby incorporated by reference herein in its entirety.

The invention claimed is:

1. A position and orientation measurement apparatus comprising:
   obtaining means for obtaining a range image of a target object captured by image capturing means;
   detection means for detecting a lost image region where distance values are not measured from the obtained range image;
   first search means for searching a geometric model which indicates a given three-dimensional shape of the target object for a lost model region corresponding to the detected lost image region;
   second search means for searching for combinations of pixels on the range image and corresponding points on the geometric model based on information indicating positions of the pixels on the range image, and information indicating positions of the points on the geometric model;
   determination means for determining whether or not each corresponding point on the geometric model detected by said second search means with respect to the pixel on the range image falls within the lost model region;
   correction means for, when said determination means determines that the corresponding point on the geometric model falls within the lost model region, correcting that combination of the pixel on the range image and the corresponding point on the geometric model detected by said second search means; and
   calculation means for calculating a position and an orientation of the target object based on the combinations of the pixels on the range image and the points on the geometric model, which are corrected by said correction means.

2. The apparatus according to claim 1, wherein said correction means deletes combinations of points on the geometric model and pixels on the range image, which are determined to fall within the lost model region, from the combinations obtained by said second search means.

3. The apparatus according to claim 1, wherein said second search means searches for the combinations to have, as corresponding points, points on the geometric model, which have minimum distances from pixels on the range image.

4. The apparatus according to claim 3, wherein said calculation means calculates a position and an orientation of the geometric model, which minimize a sum total of distances between the pixels on the range image and the points on the geometric model in the combinations, as measurement values of the position and the orientation of the target object.

5. The apparatus according to claim 4, wherein said correction means performs a correction for multiplying distances in combinations of points on the geometric model and pixels on the range image, which are determined to fall within the lost model region, by a weight which is smaller than that for distances in combinations of points on the geometric model and pixels on the range image, which are determined to fall outside the lost model region, of the combinations obtained by said second search means.

6. The apparatus according to claim 5, wherein said correction means sets a first weight for distances in combinations of points on the geometric model and pixels on the range image, which are determined to fall within the lost model region, and sets a second weight, which assumes a larger value than the first weight, for distances in combinations of points on the geometric model and pixels on the range image, which are determined to fall outside the lost model region.

7. The apparatus according to claim 6, wherein said correction means determines for the combinations of the pixels on the range image and the points on the geometric model, which are corrected by the weighting, whether or not a sum total of the distances calculated by said calculation means is less than a threshold, and after the sum total is less than the threshold, said correction means deletes combinations of points on the geometric model and pixels on the range image, which are determined to fall within the lost model region, from the combinations obtained by said second search means.

8. The apparatus according to claim 1, wherein said first search means projects the lost image region onto the geometric model with reference to a position and an orientation of the image capturing means, and extracts the projected region as the lost model region.

9. A position and orientation measurement method executed by a position and orientation measurement apparatus, comprising:

an obtaining step of obtaining a range image of a target object captured by image capturing means;

a detection step of detecting a lost image region where distance values are not measured from the range image obtained in the obtaining step;

a first search step of searching a geometric model which indicates a given three-dimensional shape of the target object for a lost model region corresponding to the detected lost image region;

a second search step of searching for combinations of pixels on the range image and corresponding points on the geometric model based on information indicating positions of the pixels on the range image, and information indicating positions of the points on the geometric model;

a determination step of determining whether or not each corresponding point on the geometric model obtained in the second search step with respect to the pixel on the range image falls within the lost model region;

a correction step of correcting, when it is determined in the determination step that the corresponding point on the geometric model falls within the lost model region, that combination of the pixel on the range image and the corresponding point on the geometric model obtained in the second search step; and a calculation step of calculating a position and an orientation of the target object based on the combinations of the pixels on the range image and the points on the geometric model, which are corrected in the correction step.

10. A program recorded on a memory device for controlling a computer to function as respective means of a position and orientation measurement apparatus according to claim 1.

* * * * *